(12) United States Patent
Usami et al.

(10) Patent No.: US 8,052,338 B2
(45) Date of Patent: Nov. 8, 2011

(54) ON-BOARD CAMERA

(75) Inventors: Masayuki Usami, Nagoya (JP);
Kiyoyuki Uchida, Konan (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 0 days.

(21) Appl. No.: 12/746,818

(22) PCT Filed: Nov. 26, 2008

(86) PCT No.: PCT/IB2008/003220
§ 371 (c)(1),
(2), (4) Date: Jun. 8, 2010

(87) PCT Pub. No.: WO2009/090457
PCT Pub. Date: Jul. 23, 2009

(65) Prior Publication Data
US 2010/0260495 A1    Oct. 14, 2010

(30) Foreign Application Priority Data

Dec. 26, 2007 (JP) ................................. 2007-335011

(51) Int. Cl.
*G03B 29/00* (2006.01)
(52) U.S. Cl. ....................... 396/419; 396/429

(58) Field of Classification Search ............... 396/419, 396/429
See application file for complete search history.

(56) References Cited

U.S. PATENT DOCUMENTS

| 6,123,306 | A * | 9/2000 | Jackson | 248/296.1 |
| 2005/0105196 | A1* | 5/2005 | Raines et al. | 359/871 |
| 2009/0115586 | A1* | 5/2009 | Lvovskiy et al. | 340/438 |
| 2010/0288573 | A1* | 11/2010 | Nishina | 180/272 |

FOREIGN PATENT DOCUMENTS

| FR | 2 837 444 | 9/2003 |
| JP | 6 189306 | 7/1994 |
| JP | 2004 58799 | 2/2004 |
| JP | 2007 69680 | 3/2007 |
| WO | 2007 029088 | 3/2007 |

* cited by examiner

*Primary Examiner* — W. B. Perkey
(74) *Attorney, Agent, or Firm* — Oblon, Spivak, McClelland, Maier & Neustadt, L.L.P.

(57) ABSTRACT

An on-board camera is disposed, behind a neighboring member that is located above a steering column, on the steering column that can move forward at the time of a collision of a vehicle in which the on-board camera is installed. The on-board camera includes: a camera portion; and a support mechanism. The support mechanism supports the camera portion in such a manner that the camera portion can move in a direction away from the neighboring member when the neighboring member and the camera portion are brought into contact with each other because of a forward movement of the steering column at the time of the collision.

15 Claims, 15 Drawing Sheets

ON-BOARD CAMERA

BACKGROUND OF THE INVENTION

1. Field of the Invention

The invention relates to a camera installed in a vehicle, and more particularly to a camera that is installed on a steering column to capture images of a driver of the vehicle.

2. Description of the Related Art

Cameras for capturing images of a driver have been installed in vehicles for monitoring the conditions of the driver of a vehicle (see Japanese Patent Application Publication No. 2007-69680, for example). Such a camera is installed on a steering column so as to facilitate capturing images of a driver.

A mechanism that moderates the impact on a driver at the time of a collision by allowing the steering column to move at the time of the collision of the vehicle. This mechanism allows a steering wheel and the steering column to move toward the front of the vehicle (far side for the driver) when a collision of the vehicle is detected. With this configuration, the impact of the steering and the driver who is thrust forward by the inertia at the time of the collision is moderated, so that it is possible to moderate the impact on the driver.

When the camera is disposed on the steering column, a meter and a meter cover are disposed above the steering column, and the camera is therefore disposed on the near side, for the driver, of the meter and the meter cover. Thus, in the case where a camera is disposed on a steering column, when a mechanism for allowing the steering column to move at the time of a collision adopted as described above, there is a fear that the camera can hinder movement of the steering column. Specifically, when the steering column moves toward the far side (for the driver), the camera on the steering column may be brought into contact with the meter cover. In this case, a sufficient range of movement of the steering column cannot be secured. In order to secure a sufficient range of movement of the steering column, it is necessary to impose limitations on the shape and the arrangement of the components, such as the camera, the meters, and the meter cover. Thus, the design of these components becomes difficult, and limitations are imposed on the design of these components.

SUMMARY OF THE INVENTION

The invention provides an on-board camera with which it is possible to secure a sufficient range of movement of a steering column without significantly reducing the degree of freedom in designing a camera on the steering column and meters.

A first aspect of the invention is an on-board camera disposed, behind a neighboring member that is located above a steering column, on the steering column that can move forward at the time of a collision of a vehicle in which the on-board camera is installed. The on-board camera includes: a camera portion; and a support mechanism. The support mechanism supports the camera portion in such a manner that the camera portion can move in a direction away from the neighboring member when the neighboring member and the camera portion are brought into contact with each other because of a forward movement of the steering column at the time of the collision.

According to the first aspect of the invention, when the steering column moves forward at the time of a vehicle collision, the on-board camera (camera portion) that contacts the neighboring member retreats in a direction away from the neighboring member. With this configuration, the interference of the on-board camera with the neighboring member that hinders movement of the steering column is not caused. Thus, according to the first aspect of the invention, it is possible to secure a sufficient range of movement of a steering column without significantly reducing the degree of freedom in designing a camera on the steering column and meters.

In the first aspect of the invention, the support mechanism may support the camera portion in such a manner that the camera portion can move rearward.

In the first aspect of the invention, the support member may include a link portion, a first support portion, and a second support portion. The first support portion is fixed to the steering column and supports one end of the link portion in such a manner that the link portion can pivot about an axis extending in a lateral direction of the vehicle. The second support portion is fixed to the camera portion at a position further forward than the first support portion and supports the other end of the link portion in such a manner that the link portion can pivot about an axis extending in the lateral direction of the vehicle.

With this configuration, the on-board camera retreats rearward and upward, and therefore, it is not required to secure a space for the on-board camera to retreat, inside or at the rear of the steering column. Thus, the degree of freedom in designing the components around the steering column is relatively increased, and the design of arrangement of the components around the steering column is made easy.

In the first aspect of the invention, the link portion may include a first member supported by the first support portion and a second member supported by the second support portion and connected to the first member in such a manner that the second member can pivot about an axis extending in a lateral direction of the vehicle.

In this configuration, the link portion is configured so as to be able to bend at a portion thereof. With this configuration, even when the on-board camera is interposed between the neighboring member and the steering wheel that is located at the rear of the steering column at the time of a vehicle collision, it is possible to reduce the possibility that the on-board camera hinders movement of the steering column.

In the first aspect of the invention, the support mechanism may support the camera portion in such a manner that the camera portion can move into the steering column.

In the first aspect of the invention, the support mechanism may be fixed to the steering column and may support one of a front end and a rear end of the camera portion in such a manner that the camera portion can pivot about an axis extending in a lateral direction of the vehicle.

In the first aspect of the invention, the support mechanism may include: a support portion fixed to the steering column; and a support shaft provided on one of the support portion and the front or rear end of the camera portion, and the support shaft may be rotatably connected to the other of the support portion and the front or rear end of the camera portion.

In the first aspect of the invention, the support mechanism may support the camera portion in such a manner that the camera portion can slide rearward on the steering column.

In the first aspect of the invention, the steering column may be provided with a rail portion, and the support mechanism may include a fitting portion fitted together with the rail portion.

In the first aspect of the invention, when a configuration is adopted in which the on-board camera retreats rearward or into the steering column, it is possible to reliably prevent the interference of the on-board camera with the neighboring member that hinders movement of the steering column.

A second aspect of the invention is an on-board camera disposed, behind a neighboring member that is located above a steering column, on the steering column that can move forward at the time of a collision of a vehicle in which the on-board camera is installed. The on-board camera includes a camera portion, a mirror portion, and a support mechanism. The camera portion is disposed in the steering column. The mirror portion has a mirror and is disposed on the steering column so as to be directed such that light incident from the rear is reflected by the mirror and incident on the camera portion. The support mechanism supports the mirror portion in such a manner that the mirror portion can move in a direction away from the neighboring member when the neighboring member and the mirror portion are brought into contact with each other because of a forward movement of the steering column at the time of the collision.

According to the second aspect of the invention, when the steering column moves forward at the time of a collision, the mirror portion that contacts the neighboring member retreats in a direction away from the neighboring member. With this configuration, the interference of the mirror portion with the neighboring member that hinders movement of the steering column is not caused. Thus, according to the second aspect of the invention, as in the case of the first aspect of the invention, it is possible to secure a sufficient range of movement of a steering column without significantly reducing the degree of freedom in designing a camera on the steering column and meters.

In the second aspect of the invention, the support mechanism may be fixed to the steering column and may support one end of the mirror portion in such a manner that the mirror portion can pivot about an axis extending in a lateral direction of the vehicle.

In the second aspect of the invention, the support mechanism may include: a support portion fixed to the steering column; and a support shaft provided on one of the support portion and the front or rear end of the mirror portion, and the support shaft may be rotatably connected to the other of the support portion and the front or rear end of the mirror portion.

In the second aspect of the invention, the support mechanism may support the mirror portion in such a manner that the mirror portion can move rearward.

In the second aspect of the invention, the support mechanism may support the mirror portion in such a manner that the mirror portion can slide rearward on the steering column.

In the second aspect of the invention, the steering column may be provided with a rail portion, and the support mechanism may include a fitting portion fitted together with the rail portion.

In the second aspect of the invention, when a configuration is adopted in which the mirror portion retreats rearward or downward, it is possible to reliably prevent the interference of the on-board camera with the neighboring member that hinders movement of the steering column.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
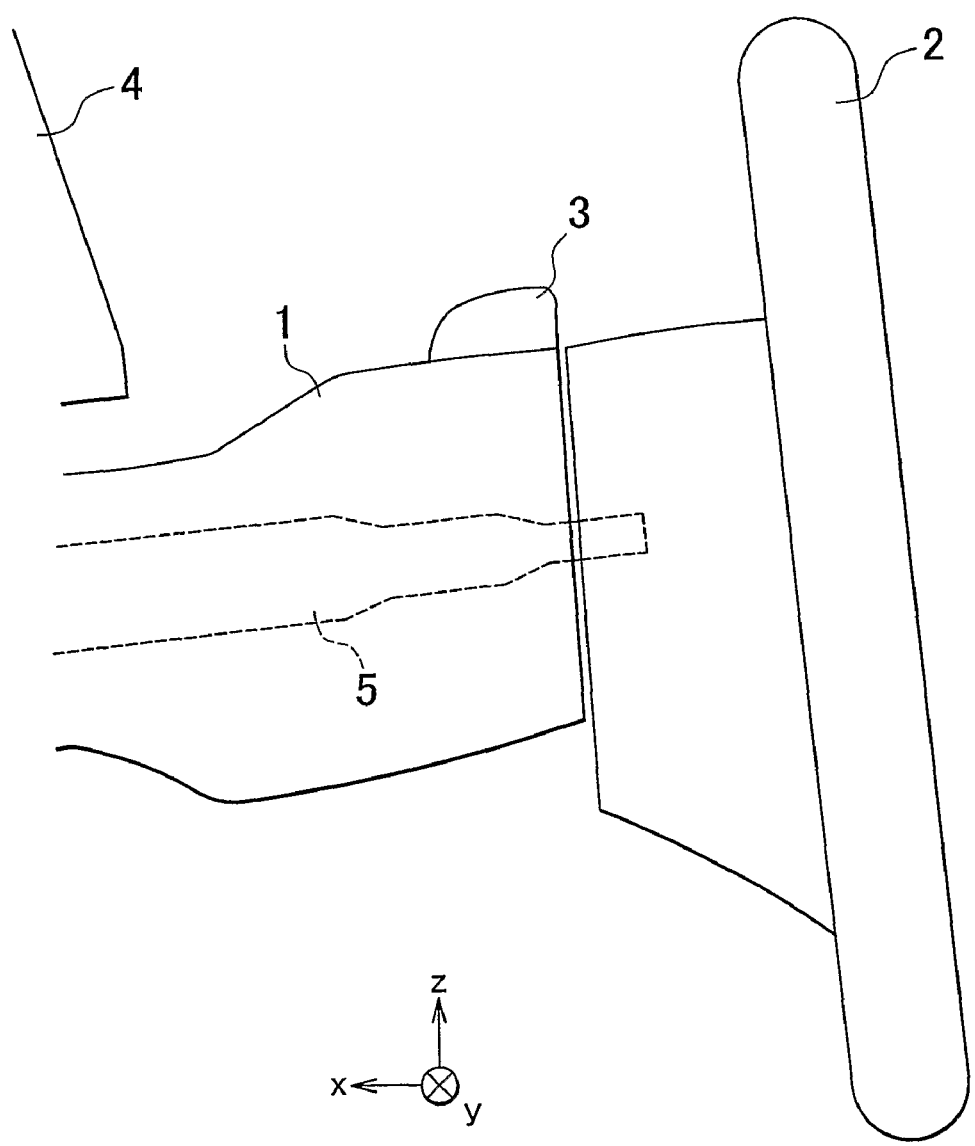
FIG. 1 is a diagram showing part of a vehicle compartment around the position at which the on-board camera is disposed.

An on-board camera according to a first embodiment of the invention will be described below with reference to FIGS. 1 to 5. FIG. 1 is a diagram showing part of a vehicle compartment around the position at which the on-board camera is disposed. The on-board camera 3 according to the first embodiment is mainly used to capture images of a driver. First, referring to FIG. 1, the disposition of the on-board camera 3 in a vehicle is described. In the description, when the longitudinal direction, the lateral direction, and the vertical direction are written without any remarks, these are intended to designate the longitudinal direction of the vehicle (x direction shown in the drawings), the lateral direction of the vehicle (y direction shown in the drawings), and the vertical direction of the vehicle (z direction shown in the drawings), respectively.

In FIG. 1, a steering column 1 is a member that is disposed on the front side of a steering wheel 2 (the positive direction side with respect to the x axis shown in FIG. 1) and covers a shaft 5 connected to the steering wheel 2. A meter cover 4 that is the cover of instruments, such as meters, is disposed above the steering column 1. In this embodiment, the meter cover 4 serves as the neighboring member of the invention. In this embodiment, the on-board camera 3 is disposed on the rear side of the meter cover 4 (the negative direction side with respect to the x axis shown in FIG. 1) on the steering column 1. The on-board camera 3 is disposed so that the direction in which the image is captured is rearward (slightly upward). When the on-board camera 3 is disposed in this way, the on-board camera 3 can capture images of the face of the driver through the steering wheel 2. The image captured by the on-board camera 3 is used to monitor the conditions of the driver of the vehicle, for example. Specifically, an information processor (ECU) mounted in the vehicle uses the image captured by the on-board camera 3 to detect the orientation of the face of the driver, how the eyes of the driver are opened, etc. For example, the information processor determines whether a driver looks aside based on the orientation of the face of the driver, and determines whether the driver dozes based on how the eyes are opened.

Figure 2:
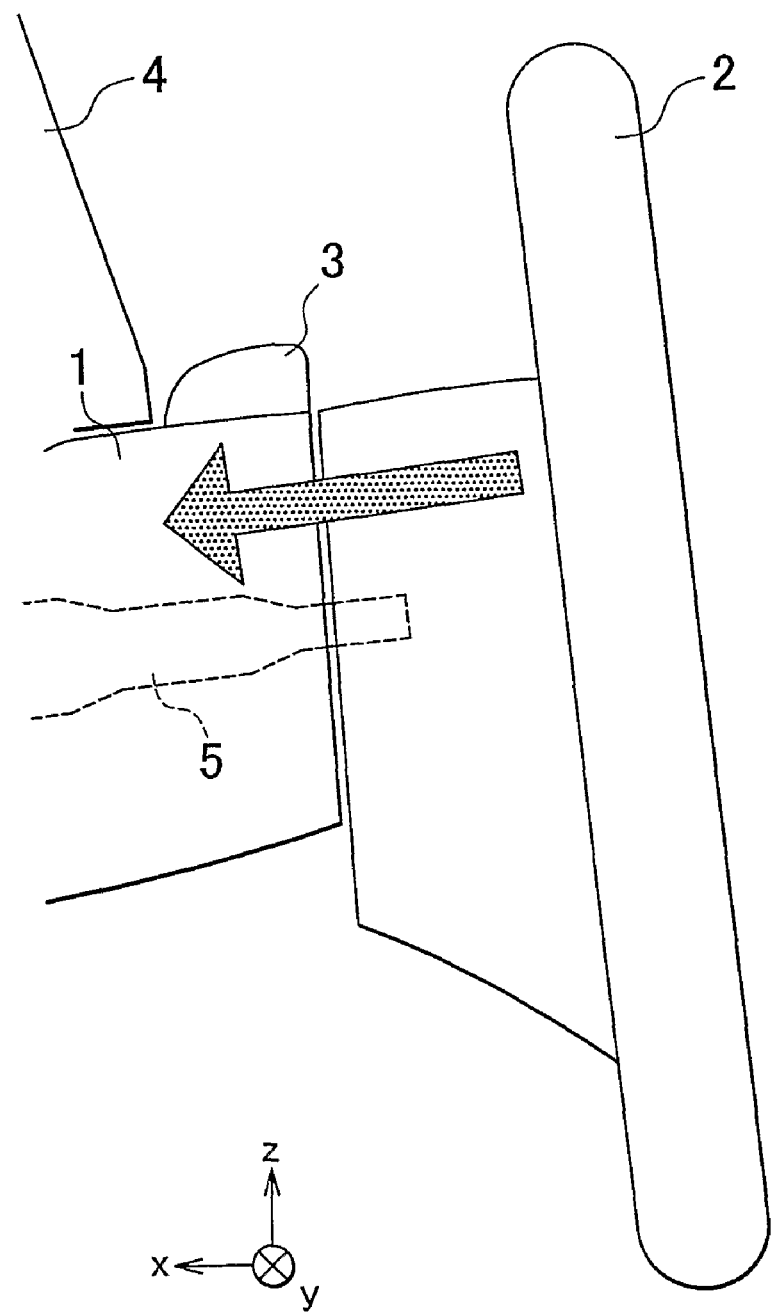
FIG. 2 is a diagram showing a situation in which the steering column has moved forward.

In this embodiment, the steering column 1 is configured to be able to move forward when the vehicle collides. FIG. 2 is a diagram showing a situation in which the steering column 1 has moved forward. The vehicle is designed so that when a collision is detected, the steering column 1 and the steering wheel 2 can move forward (far side for the driver, see the arrow shown in FIG. 2). This configuration is intended to moderate the impact of the steering and the driver who is thrust forward by the inertia at the time of the collision.

In FIG. 2, when the steering column 1 moves forward, the on-board camera 3 on the steering column 1 contacts the meter cover 4. For this reason, in this configuration, the stroke of the steering column 1 is limited, and therefore, there is a fear that a sufficient stroke cannot be secured. On the other hand, if a configuration is adopted in which the on-board camera 3 and the meter cover 4 are not brought into contact with each other to secure a sufficient stroke of the steering column 1, it is necessary to impose limitations on the shape and the arrangement of the components, such as the on-board camera 3 and the meter cover 4. Thus, the design of these components becomes difficult, and limitations are imposed on the designs of these components.

Under such circumstances, in this embodiment, a configuration is adopted in which the on-board camera 3 retreats in the direction such that the on-board camera 3 moves away from the meter cover 4 when the meter cover 4 and the on-board camera 3 are brought into contact with each other because of the forward movement of the steering column 1 at the time of the vehicle collision. A specific configuration of the on-board camera 3 will be described below.

Figure 3:
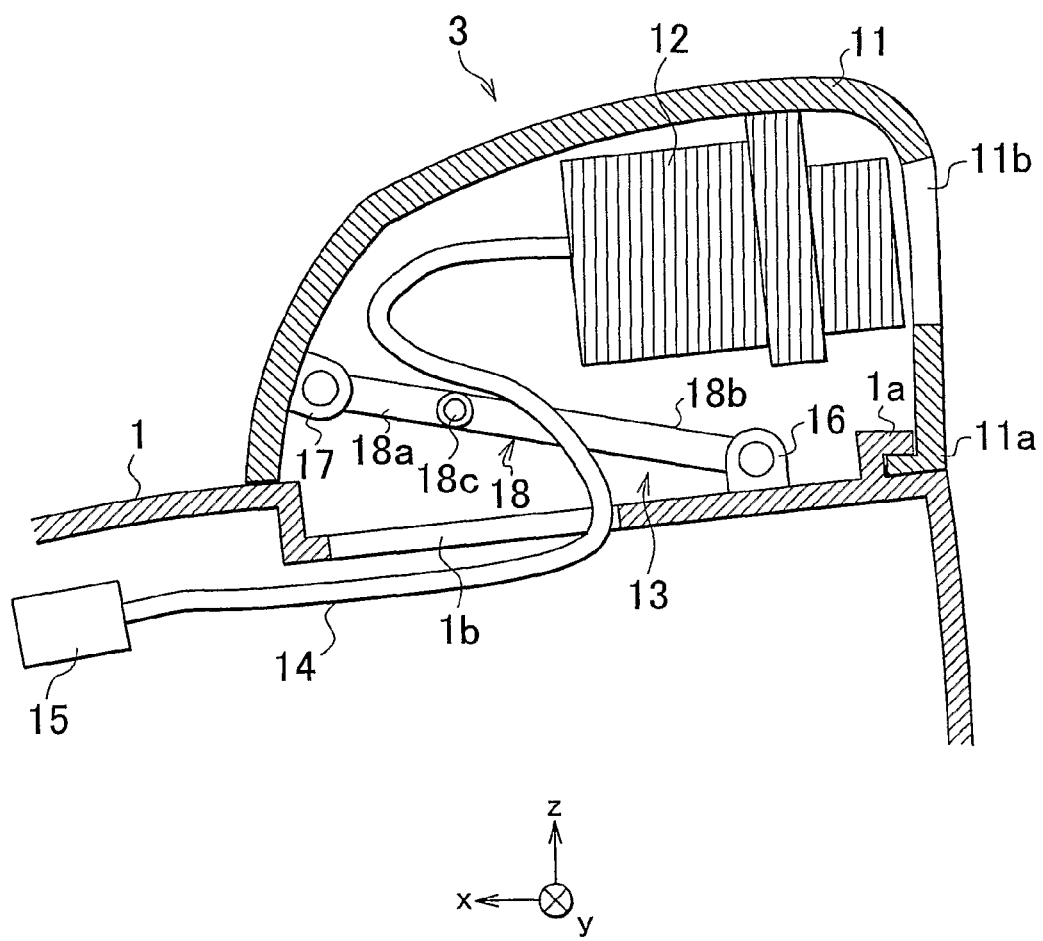
FIG. 3 is a cross sectional view when the on-board camera according to the first embodiment is viewed in the lateral direction.
Figure 4:
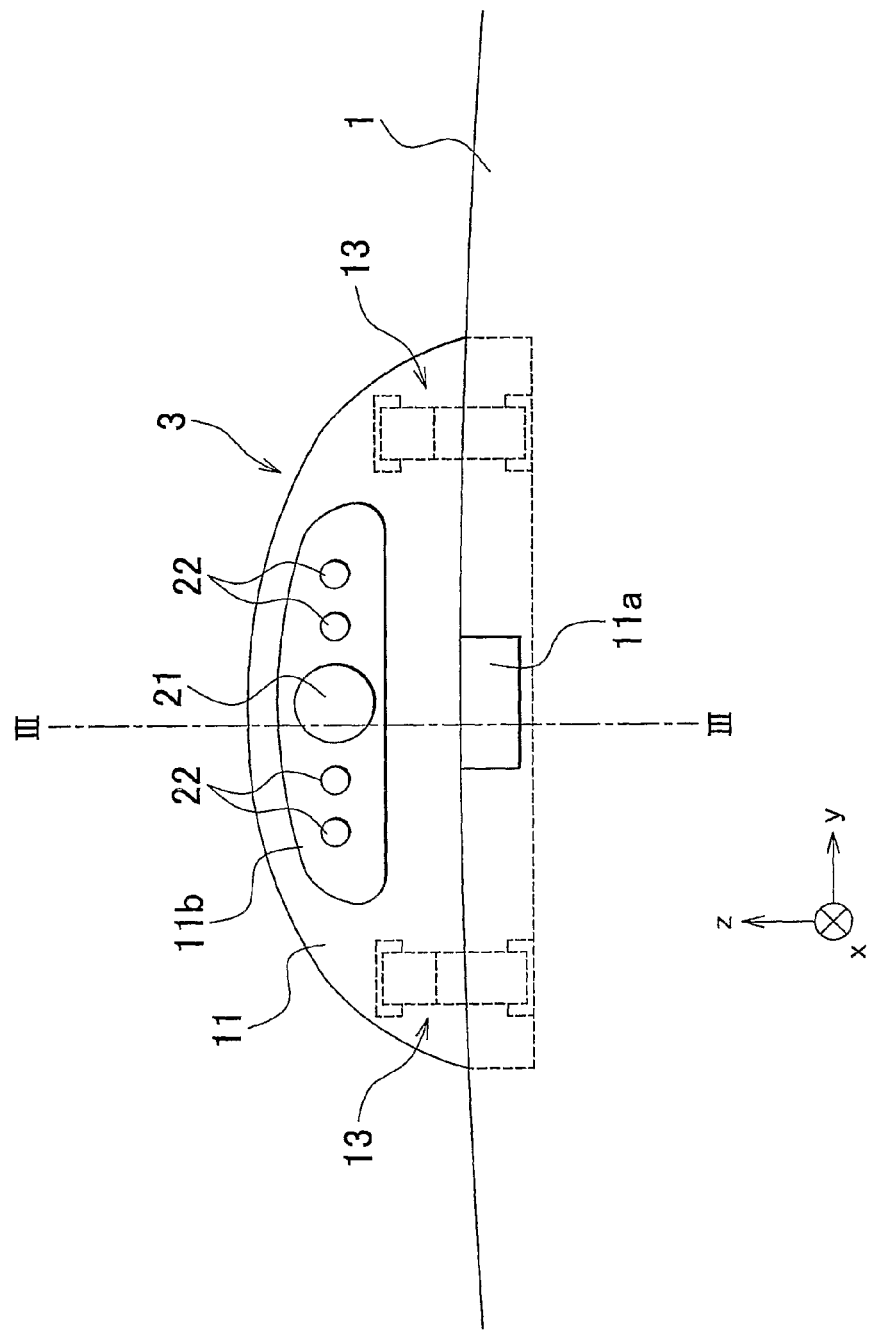
FIG. 4 is a diagram of the on-board camera, shown in FIG. 3, that is viewed from the rear side.

First, referring to FIGS. 3 and 4, an arrangement of the on-board camera 3 under normal conditions (when there is no collision of the vehicle). will be described. FIG. 3 is a cross sectional view when the on-board camera 3 according to the first embodiment is viewed in the lateral direction. FIG. 4 is a diagram of the on-board camera 3 that is viewed from the rear side. Note that FIG. 3 is a cross sectional view taken along line III-III shown in FIG. 4. As shown in FIG. 3, the on-board camera 3 is provided with a casing 11, a camera body 12, a support mechanism 13, and a cable 14.

The casing 11 has a dome shape, and is disposed on the upper surface of the steering column 1. In this way, a space is created between the casing 11 and the upper surface of the steering column 1. As described later, the camera body 12 is disposed in this space. Note that in order to maximize the stroke of the steering column 1 at the time of a collision, it is preferable that the casing 11 be disposed near the rear end of the steering column 1. The casing 11 is typically made of resin as in the case of the steering column 1. As shown in FIG. 3, the casing 11 is disposed so as to be long along the longitudinal direction rather than the vertical direction under normal conditions.

The camera body 12 is housed in the casing 11, and fixed to the inner wall of the casing 11. A camera lens 21 and LEDs 22 for lighting (four LEDs in FIG. 4) are provided in the rear side of the camera body 12. In this embodiment, the camera body 12 includes a near infrared camera, for example, and the LEDs 22 are near infrared LEDs, for example. In a rear portion of the casing 11, a hole 11b is provided so that the camera lens 21 and the LEDs 22 are exposed to the outside of the casing 11 (see FIG. 4). Thus, the camera body 12 is capable of capturing an image of a driver through the hole 11b. In the first embodiment, the casing 11 and the camera body 12 serve as the camera portion of the invention.

The support mechanism 13 supports the casing 11 (and the camera body 12). The support mechanism 13 supports the camera portion (the casing 11 and the camera body 12) in such a manner that the camera portion can move in the direction away from the meter cover 4 when the meter cover 4 and the camera portion are brought into contact with each other because of the forward movement of the steering column 1 at the time of a collision. In the first embodiment, the two ends of the support mechanism 13 are connected to the upper surface of the steering column 1 and the inner wall of the casing 11 respectively, and the support mechanism 13 supports the casing 11 so that the casing 11 moves rearward when the casing 11 and the meter cover 4 are brought into contact with each other.

As shown in FIG. 3, the support mechanism 13 includes a first support portion 16, a second support portion 17, and a link portion 18. The first support portion 16 is fixed to the upper surface of the steering column 1. Note that it is preferable that the first support portion 16 be disposed in the rear side of the on-board camera 3 (more preferably, near the rear end thereof). The second support portion 17 is fixed to the inner wall of the casing 11. The second support portion 17 is fixed on the front side of the first support portion 16 (the positive direction side with respect to the x axis shown in FIG. 3). The link portion 18 is a rod-like member, and the two ends thereof are connected to the support portions 16 and 17, respectively. The first support portion 16 supports one end of the link portion 18 in such a manner that the link portion 18 can pivot about an axis extending in the lateral direction (y direction shown in FIG. 3). The first support portion 16 supports the other end of the link portion 18 in such a manner that the link portion 18 can pivot about an axis extending in the lateral direction. In the above-described configuration, the support mechanism 13 supports the casing 11 in such a manner that the casing 11 can move rearward. Although in this embodiment, the on-board camera 3 includes right and left, two support mechanisms 13 as shown in FIG. 4, the number of support mechanisms 13 may be one, or may be three or more in another embodiment.

Further, in this embodiment, the link portion 18 is constituted of two rod-like members, which are a first member 18a and a second member 18b. The first member 18a is supported by the first support portion 16, and the second member 18b is supported by the second support portion 17. The first member 18a and the second member 18b are connected to each other at a connection portion 18c in such a manner that these members can pivot about an axis extending in the lateral direction. In this way, the link portion 18 is configured so as to be able to bend at the connection portion 18c.

As shown in FIGS. 3 and 4, a hook portion 11a is formed at the lower end of the rear portion of the casing 11. Meanwhile, a hook portion 1a that can be engaged with the hook portion 11a is formed at the upper end of the rear portion of the steering column 11. Under normal conditions, as shown in FIG. 3, the hook portion 11a of the casing 11 and the hook portion 1a of the steering column 1 are engaged with each other. Accordingly, under normal conditions, the casing 11 is secured to the steering column 1 by the hook portion 11a (while the support mechanism 13 supports the casing 11 in such a manner that the casing 11 can move rearward). Because the hook portions 11a and 1a are made of resin that has a certain elasticity, the engagement between the hook portions 11a and 1a is released when a strong force is applied that forces the casing to move.

The cable 14 electrically connects the camera body 12 and a connector 15 that is installed in the steering column 1. A hole 1b is provided in a part of the region of the upper surface of the steering column 1 that is covered by the casing 11. The cable 14 is passed through the hole 1*b*, and connects between the camera body 12 and the connector 15. It is preferable to give the length of the cable 14 a redundancy under normal conditions in consideration of the fact that the casing 11 and the camera body 12 move rearward at the time of a collision (see FIG. 5). The connector 15 is connected to the above-described information processor (the ECU that determines conditions of the driver with the use of the image captured by the on-board camera 3).

Next, referring to FIG. 5, operation of the on-board camera 3 at the time of a vehicle collision will be described. As described above, under normal conditions, the on-board camera 3 is disposed on the steering column 1 in the state shown in FIG. 3. When the steering column 1 moves forward in response to a collision of the vehicle, the meter cover 4 is brought into contact with a front portion of the casing 11 of the on-board camera 3. At this time, the casing 11 is pushed from the front by the meter cover 4, and therefore, a force that forces the casing 11 to move rearward is applied to the casing 11. When the meter cover 4 applies a certain impact to the casing 11, such as when the steering column 1 moves at the time of a vehicle collision, the engagement between the hook portion 11*a* of the casing 11 and the hook portion 1*a* of the steering column 1 is released because the force that causes the casing 11 to move rearward is large. As a result, the casing 11 moves rearward.

Figure 5:
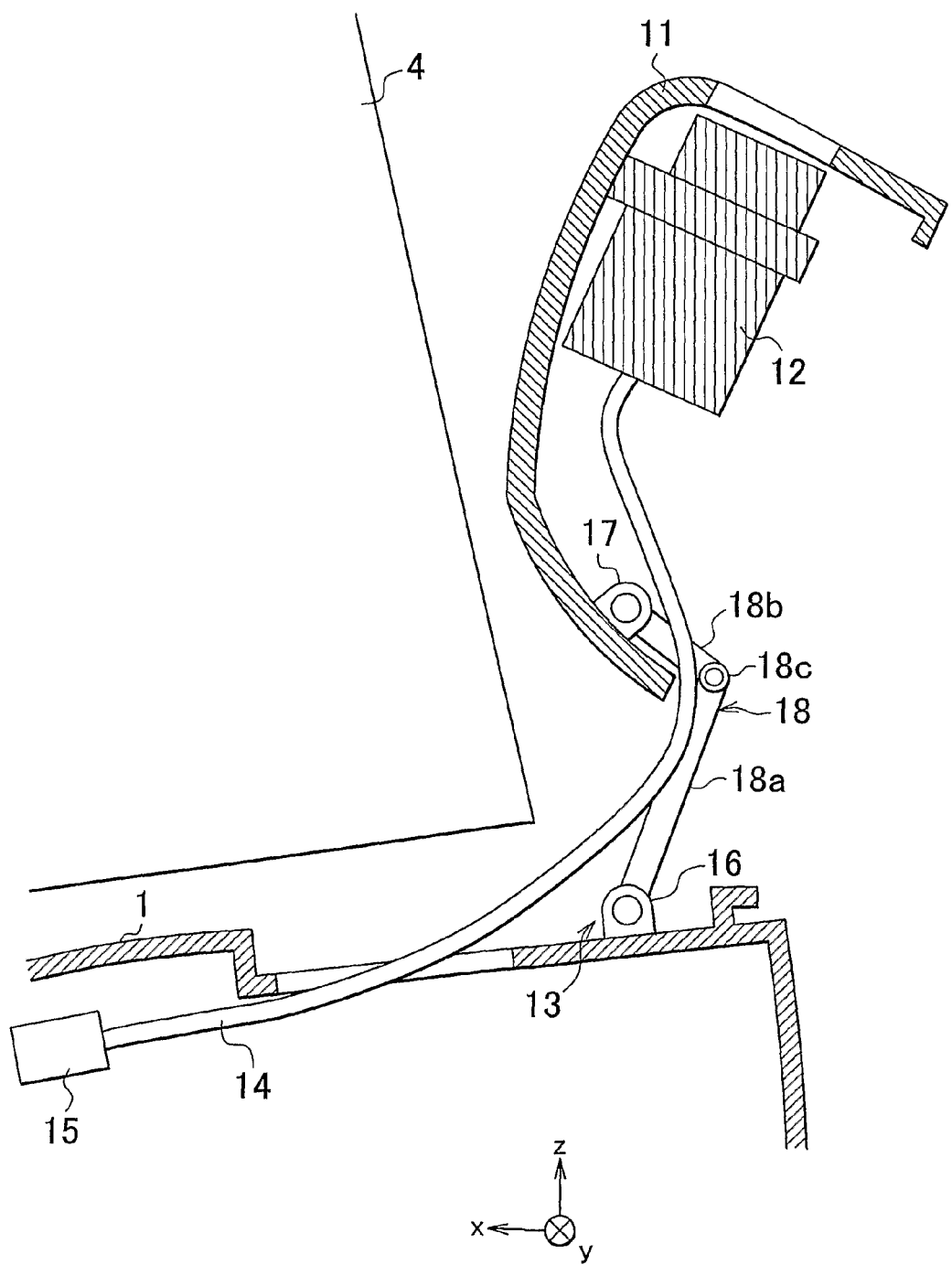
FIG. 5 is a diagram showing a state of the on-board camera at the time of a collision.

FIG. 5 is a diagram showing a state of the on-board camera 3 at the time of a collision. As described above, when the engagement between the hook portion 11*a* of the casing 11 and the hook portion 1*a* of the steering column 1 is released, the casing 11 moves rearward away from the upper surface of the steering column 1. Because the casing 11 and the steering column 1 are connected by the link portion 18 of the support mechanism 13, the casing 11 moves according to the trajectory of the pivotal movement of the link portion 18. Because the casing 11 is connected to the steering column 1 at the first support portion 16, the casing 11 can move further rearward than the position of the first support portion 16, and the steering column 1 can move at least to the position at which the meter cover 4 reaches the position of the first support portion 16. Consequently, according to the first embodiment, the steering column 1 can move further forward and the range in which the steering column 1 moves is increased as compared to the case where the on-board camera 3 is fixed to the steering column 1.

Moreover, in the first embodiment, the first member 18*a* and the second member 18*b* of the link portion 18 are pivotally connected to each other at the connection portion 18*c*. Thus, when the casing 11 is brought into contact with the steering wheel 2 as a result of the rearward movement of the casing 11, the link portion 18 is bent at the connection portion 18*c*, and the longitudinal direction of the casing 11 is directed along the vertical direction (directed so that the direction in which the camera body 12 captures an image becomes upward) (see FIG. 5). It is conceivable that the casing 11 is interposed between the front-side meter cover 4 and the rear-side steering wheel 2 at the time of a vehicle collision and the steering column 1 cannot move further forward. In such a case, the steering column 1 can move further forward in the situation where the casing 11 is positioned so as to be long in the vertical direction, as compared to the situation where the casing 11 is positioned so as to be long in the longitudinal direction of the vehicle (the direction the same as that of the casing 11 shown in FIG. 3). This is because the interval between the meter cover 4 and the steering wheel 2 can become smaller in the situation where the casing 11 is positioned so as to be long in the vertical direction, as compared to the situation where the casing 11 is positioned so as to be long in the longitudinal direction. As described above, in this embodiment, by adopting a configuration in which the link portion 18 is bent at the connection portion 18*c*, it is possible to position the casing 11 so as to be long in the vertical direction when the casing 11 moves at the time of a vehicle collision. Thus, the steering column 1 can move further forward.

As described above, according to the first embodiment, when the steering column 1 moves forward at the time of a vehicle collision, the on-board camera 3 that contacts the meter cover 4 retreats rearward and upward. Thus, the interference of the on-board camera 3 with the meter cover 4 that hinders movement of the steering column 1 is not caused, and it is possible to secure a sufficient range of movement of the steering column 1.

Moreover, in the first embodiment, the on-board camera 3 that contacts the meter cover 4 retreats rearward or upward, so that it is unnecessary to secure a space for the on-board camera 3 to retreat, inside or at the rear of the steering column 1. In the configurations shown in FIGS. 6 and 9, on the other hand, it is required to secure a space for the on-board camera 3 to retreat, inside or at the rear of the steering column 1. In this point, the on-board camera 3 according to the first embodiment is advantageous over those with the configurations shown in FIGS. 6 and 9 described later.

In the first embodiment, the casing 11 is secured to the steering column 1 under normal conditions by engaging the hook portion 11*a* of the casing 11 with the hook portion 1*a* of the steering column 1. In another embodiment, the support mechanism 13 may be maintained in a normal condition by an urging member, such as a spring, instead of (or in addition to) using the hook portions 11*a* and 1*a*. Specifically, a spring for urging the link portion 18 in the direction such that the support mechanism 13 is maintained in a normal condition may be attached to the support portions 16 and 17. In addition, a spring for urging the first and second members 18*a* and 18*b* in the direction such that the first and second members 18*a* and 18*b* of the link portion 18 is maintained in a normal condition may be attached to the link portion 18. As in the case of the first embodiment, this configuration also allows the casing 11 to move at the time of a collision, while it is possible to secure the casing 11 to the steering column 1 under normal conditions, and allow the casing 11 to move at the time of a collision.

Next, an on-board camera 3 according to a second embodiment of the invention will be described. In the first embodiment, the on-board camera retreats rearward and upward when the on-board camera contacts the meter cover 4, whereas the on-board camera retreats into the steering column when the on-board camera contacts the meter cover 4. The on-board camera according to the second embodiment will be described in detail below with reference to FIGS. 6 to 8.

Figure 6:
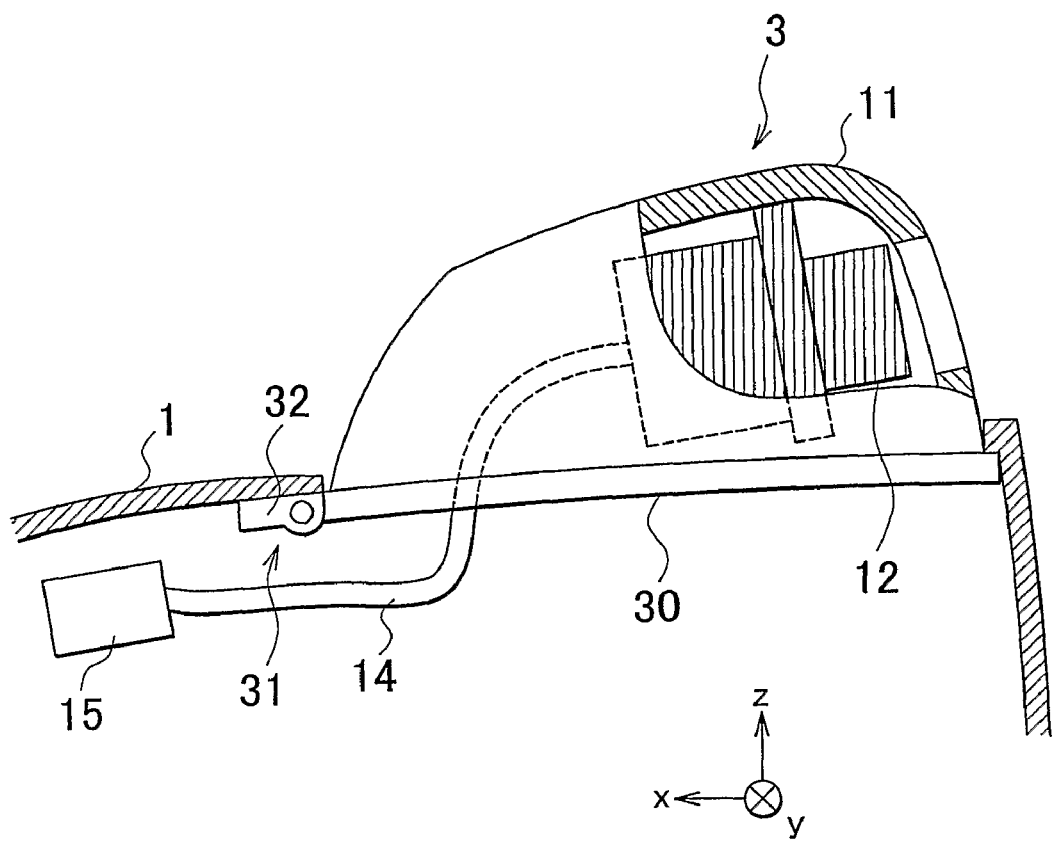
FIG. 6 is a cross sectional view when the on-board camera according to the second embodiment is viewed in the lateral direction.
Figure 7:
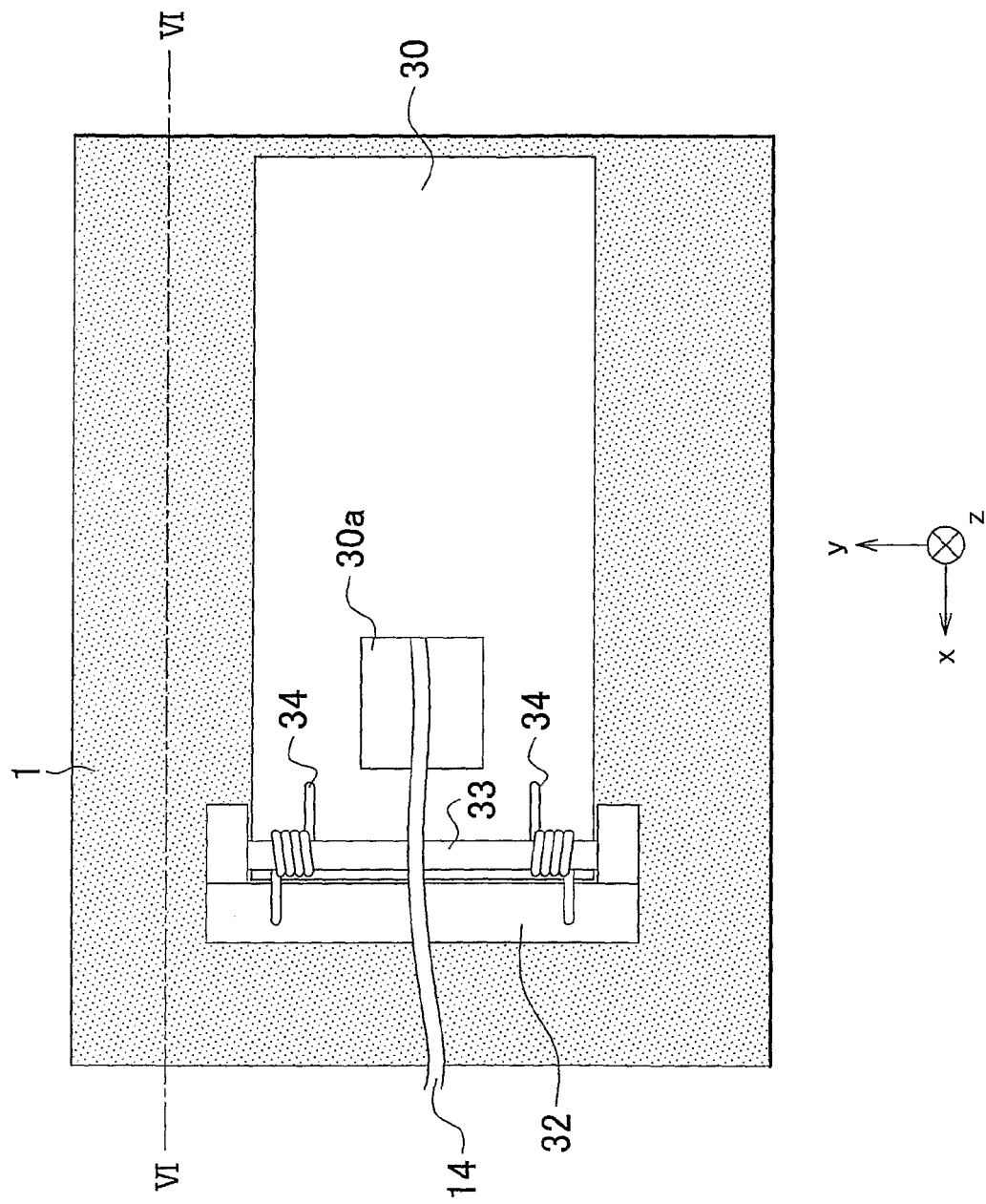
FIG. 7 is a diagram of the on-board camera, shown in FIG. 6, that is viewed from below.

FIG. 6 is a cross sectional view when the on-board camera according to the second embodiment is viewed in the lateral direction. FIG. 7 is a diagram of the on-board camera 3, shown in FIG. 6, that is viewed from below (from inside the steering column). Note that FIG. 6 is a cross sectional view taken along line VI-VI shown in FIG. 7. In the second embodiment, the position on the steering column 1 at which the on-board camera 3 is disposed is similar to that in the case of the first embodiment (FIG. 1).

The on-board camera 3 of the second embodiment is provided with the casing 11, the camera body 12, and the cable 14 similar to those of the first embodiment. The on-board camera 3 of the second embodiment is further provided with a bottom plate 30, and is provided with a support mechanism 31 instead of the support mechanism 13 of the first embodiment. As shown in FIGS. 6 and 7, the support mechanism 31 includes a support portion 32, a support shaft 33, and springs 34 (two springs in FIG. 6).

As shown in FIG. 6, the casing 11 and the camera body 12 similar to those of the first embodiment are fixed to the upper surface of the bottom plate 30. In the second embodiment, the casing 11, the camera body 12, and the bottom plate 30 serve as the camera portion of the invention. In addition, a hole 30a is provided in the bottom plate 30, and the cable 14 is passed through the hole 30a and connects between the camera body 12 and the connector 15.

The support portion 32 is fixed to the steering column 1, and supports the support shaft 33 in such a manner that the support shaft 33 can rotate about an axis extending in the lateral direction. The support shaft 33 is fixed to the front end of the bottom plate 30. Thus, the support portion 32 supports the front end of the camera portion (the casing 11, the camera body 12, and the bottom plate 30) in such a manner that the camera portion can pivot about an axis extending in the lateral direction. In the second embodiment, a hole with a size slightly smaller than the size of the bottom plate 30 is provided in the steering column 1. Under normal conditions, the support portion 32 supports the bottom plate 30 in such a manner that the bottom plate 30 closes the hole. Specifically, the springs 34 for urging the bottom plate 30 in the direction such that the bottom plate 30 closes the hole are attached to the support shaft 33. The springs 34 are urging members for urging the camera portion so that the bottom plate 30 closes the hole, that is, so that the camera portion juts out above the steering column 1. As described above, in the second embodiment, under normal conditions, the camera body 12 is fixed in a state where the camera body juts out above the steering column 1, by virtue of the springs 34.

As can be seen from the configuration described above, in the second embodiment, the support mechanism 31 supports the front end of the camera portion in a state where the camera portion can pivot about an axis extending in the lateral direction. Thus, the support mechanism 31 supports the camera portion in such a manner that the camera portion can be retracted into the steering column 1. In another embodiment, the support mechanism 31 may support the rear end of the camera portion in a state where the camera portion can pivot about an axis extending in the lateral direction. This configuration also allows the support mechanism 31 to support the camera portion in such a manner that the camera portion can be retracted into the steering column 1.

Figure 8:
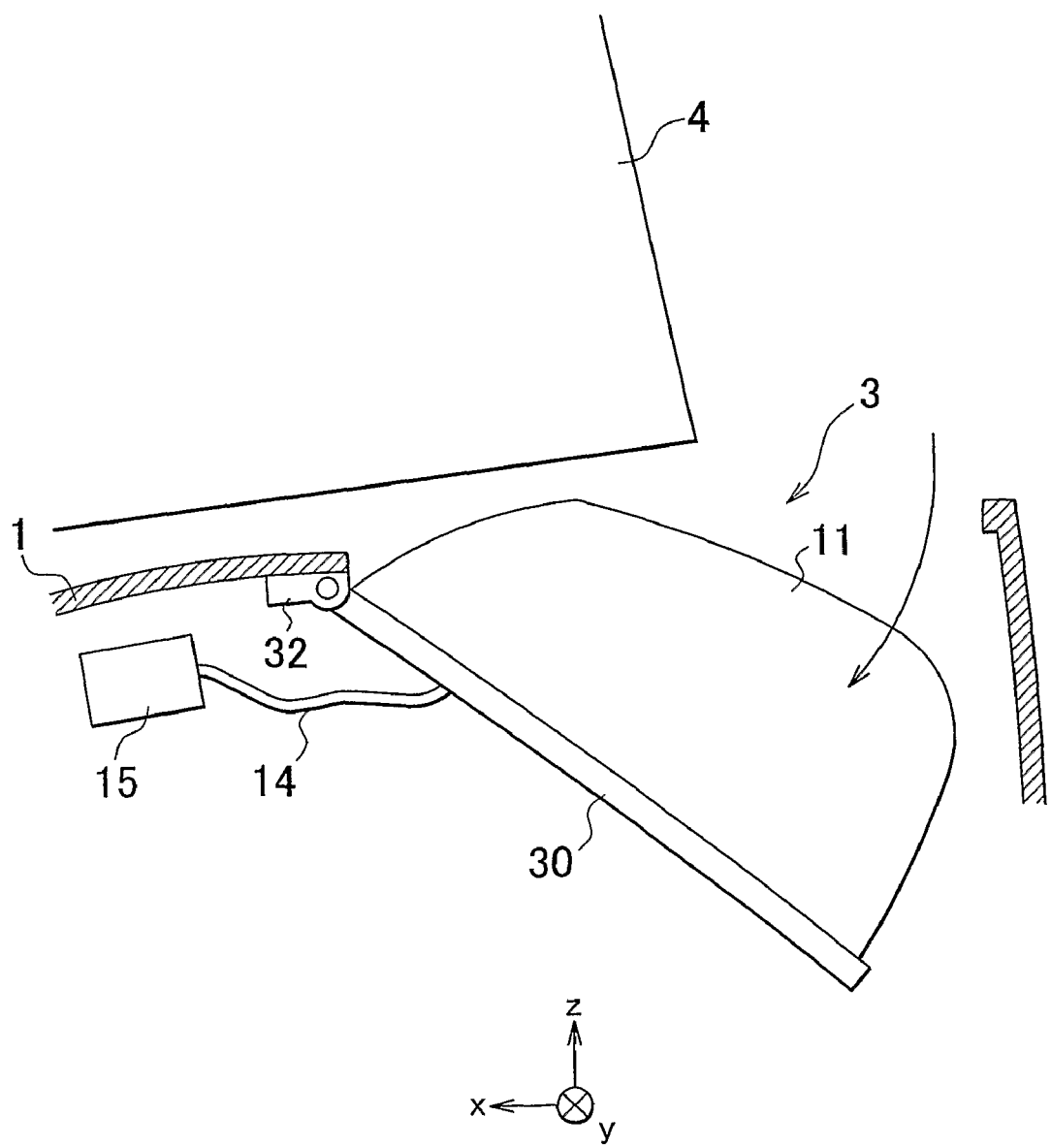
FIG. 8 is a diagram showing a state of the on-board camera according to the second embodiment at the time of a vehicle collision.

FIG. 8 is a diagram showing a state of the on-board camera 3 according to the second embodiment at the time of a vehicle collision. Also in the case of the second embodiment, when the steering column 1 moves forward in response to a collision of the vehicle, the meter cover 4 is brought into contact with a front portion of the on-board camera 3, as in the case of the first embodiment. The on-board camera 3 is pivoted about an axis, extending in the lateral direction, at the front end at which the on-board camera 3 is supported by the support mechanism 32, by the force exerted by the meter cover 4 from the front. As a result, the on-board camera 3 moves into the steering column 1 as shown in FIG. 8. Thus, the on-board camera 3 retreats from the position at which the on-board camera 3 contacts the meter cover 4, so that the movement of the steering column 1 is not hindered by the contact between the meter cover 4 and the on-board camera 3, and the steering column 1 can therefore move further forward.

As described above, according to the second embodiment, when the steering column 1 moves forward at the time of a vehicle collision, the on-board camera 3 that contacts the meter cover 4 retreats into the steering column 1. Thus, the interference of the on-board camera 3 with the meter cover 4 that hinders movement of the steering column 1 is not caused, and it is possible to secure a sufficient range of movement of the steering column 1.

In the second embodiment, in order to secure the camera body 12 in a state where the camera body juts out above the steering column 1 under normal conditions, the bottom plate 30 is urged by the springs 34. In another embodiment, instead of using the springs 34, a configuration may be adopted in which a hook-like engagement portion may be provided at an end portion (rear end portion in the case of the second embodiment) of the bottom plate 30 on the side opposite to the end portion at which the bottom plate 30 is supported by the support mechanism 31. It is possible to secure the camera body 12 in a state where the camera body 12 juts out above the steering column 1 by engaging the engagement portion with the upper surface of the steering column 1.

A modification of the configuration for retreating the camera portion will now be described. In the first embodiment, the on-board camera is moved rearward and upward when the on-board camera contacts the meter cover 4. In the second embodiment, the on-board camera is moved into the steering column 1 when the on-board camera contacts the meter cover 4. The direction in which the on-board camera moves when the on-board camera contacts the meter cover has only to be the direction in which the on-board camera moves away from the meter cover 4. As the configuration for moving the camera portion, the following configuration, for example, is conceivable in addition to those of the first and second embodiments.

Figure 9:
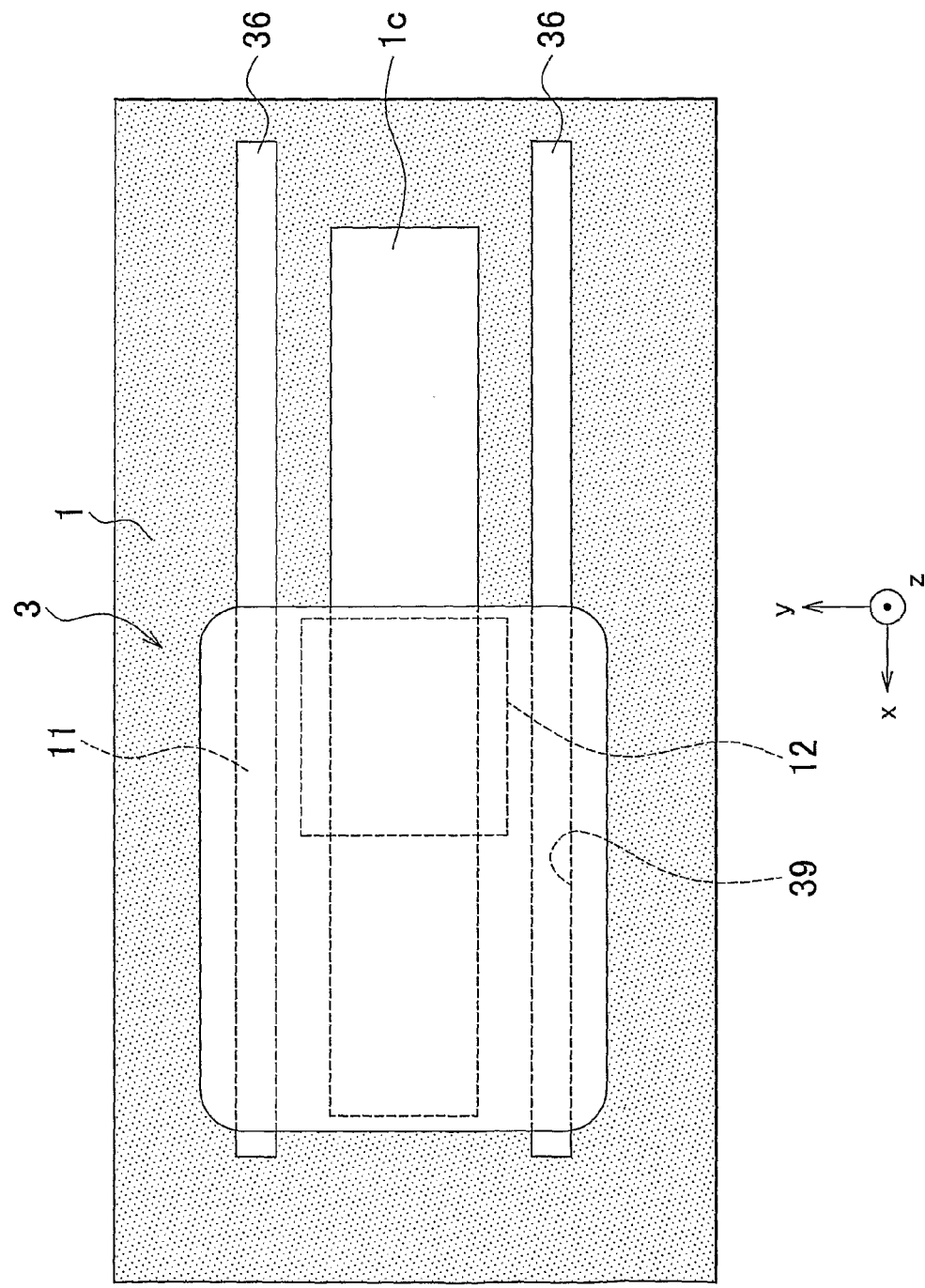
FIG. 9 is a diagram showing a configuration of an on-board camera of another embodiment.

FIG. 9 is a diagram showing a configuration of an on-board camera of another embodiment. FIG. 9 is a diagram of the on-board camera 3 and the steering column 1 that are viewed from above. In the configuration shown in FIG. 9, rails 36 extending in the longitudinal direction are provided on the upper surface of the steering column 1. The on-board camera 3 is installed so as to be able to slide on the rails 36. Specifically, fitting portions 39 that are fitted on the rails 36 are provided in the lower surface of the on-board camera 3, and the on-board camera 3 is installed on the rails 36 such that the fitting portions 39 are fitted on the rails 36. With the configuration described above, it is possible to allow the on-board camera to slide on the steering column in the longitudinal direction. In the configuration shown in FIG. 9, the fitting portions 39 serve as the support mechanism of the invention. This modification is similar to the above-described embodiments in that the on-board camera 3 is provided with the casing 11, the camera body 12, and the cable 14. In the configuration shown in FIG. 9, a hole 1c through which the cable 14 for connecting between the camera body 12 and the connector in the steering column 1 is passed is provided in the upper surface of the steering column 1.

Under normal conditions, the on-board camera 3 is disposed on the front of the rails 36. The on-board camera 3 may be urged forward by a spring or the like in order to secure the on-board camera 3 on the front of the rails 36 under normal conditions. The on-board camera 3 may be secured on the front of the rails 36 by providing the on-board camera 3 with a hook-like member and engaging the hook-like member with the steering column 1.

In FIG. 9, when the steering column 1 moves forward in response to a collision of the vehicle, and the meter cover 4 thus contacts a front portion of the on-board camera 3, the on-board camera 3 is pushed by the meter cover 4 and slides backward. Thus, the on-board camera 3 retreats from the position at which the on-board camera 3 contacts the meter cover 4, so that the movement of the steering column 1 is not hindered by the contact between the meter cover 4 and the on-board camera 3, and the steering column 1 can therefore move further forward. As described above, the configuration shown in FIG. 9 also allows the on-board camera 3 to retreat in the direction in which the on-board camera 3 moves away from the meter cover 4.

Next, an on-board camera 3 according to a third embodiment of the invention will be described. In the above-described first and second embodiments, the on-board camera has a configuration in which the camera body is disposed on the steering column. In the third embodiment, on the other hand, the on-board camera has a configuration in which the camera body is housed in the steering column. The on-board camera according to the third embodiment will be described in detail below with reference to FIGS. 10 to 12.

Figure 10:
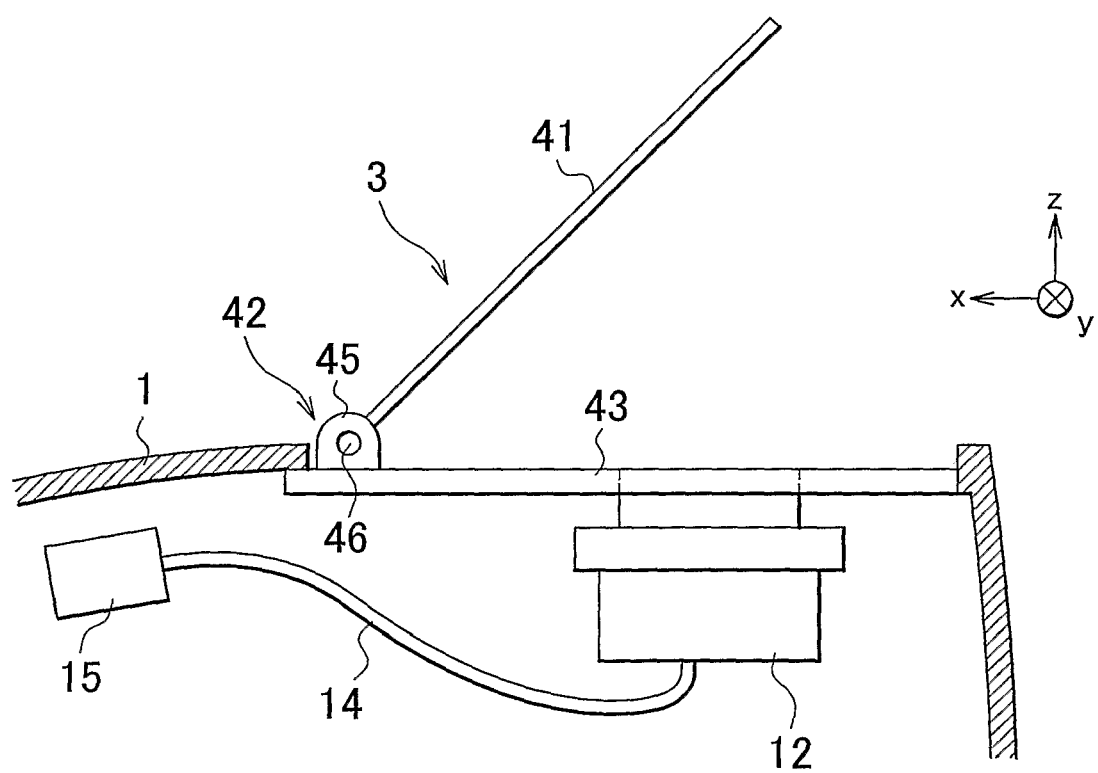
FIG. 10 is a cross sectional view when the on-board camera according to a third embodiment is viewed in the lateral direction.
Figure 11:
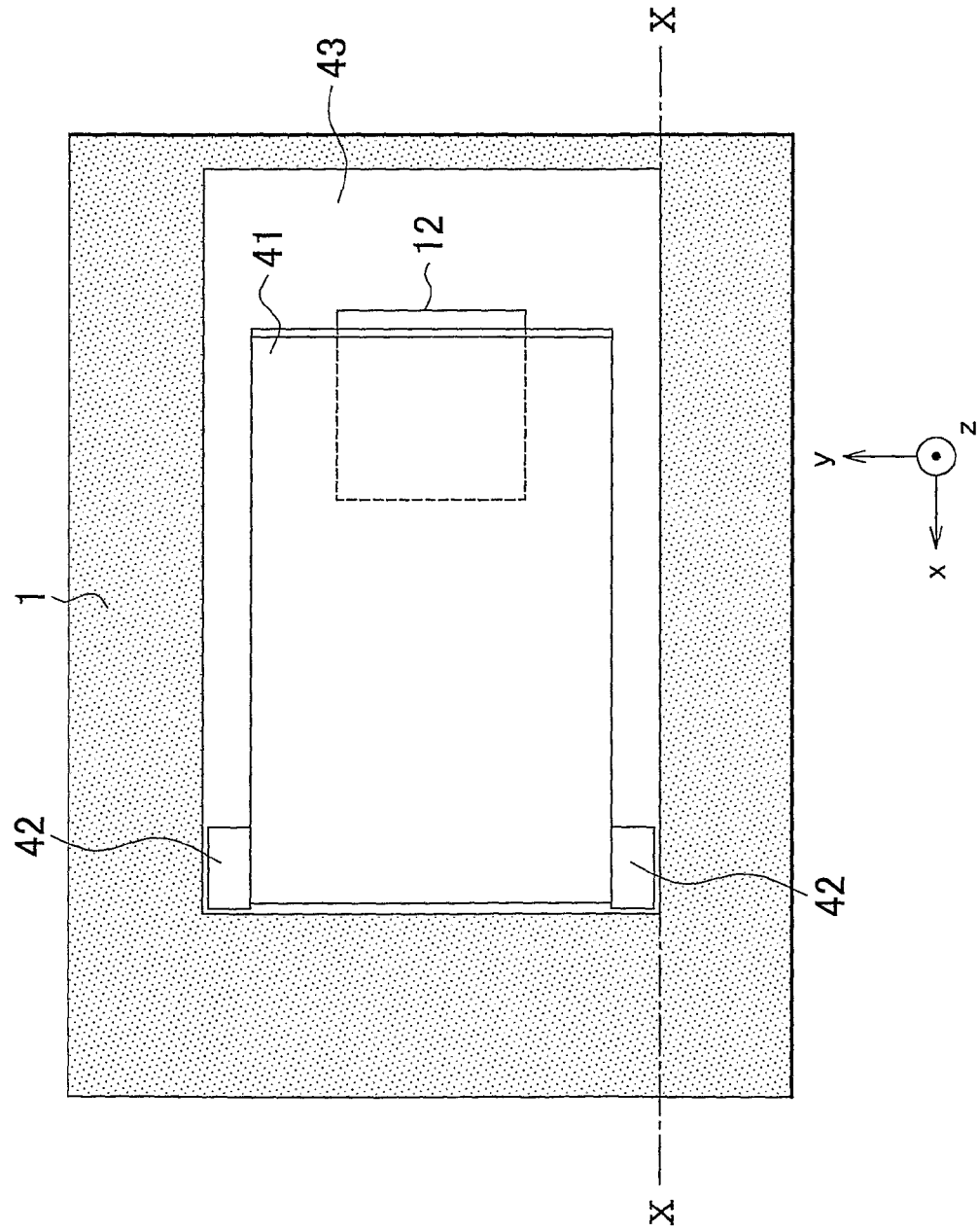
FIG. 11 is a diagram of the on-board camera, shown in FIG. 10, that is viewed from above.

FIG. 10 is a cross sectional view when the on-board camera according to the third embodiment is viewed in the lateral direction. FIG. 11 is a diagram of the on-board camera 3, shown in FIG. 10, that is viewed from above. Note that FIG. 10 is a cross sectional view taken along line X-X shown in FIG. 11. In the third embodiment, the arrangement of the steering column 1, the steering wheel 2, and the meter cover 4 is similar to that in the case of the first embodiment (FIG. 1). As shown in FIGS. 10 and 11, the on-board camera 3 is provided with the camera body 12, a cable 14, a mirror portion 41, and a support mechanism 42. The support mechanism 42 includes a support portion 45 and a support shaft 46.

In FIG. 10, a hole is provided in the steering column 1, and a base portion 43, which is part of the steering column 1, is attached to the upper surface of the steering column 1 so as to close the hole. The camera body 12 is attached to the lower side of the base portion 43. The camera body 12 is attached such that the camera lens and the LEDs are exposed to the upper side of the base portion 43. Specifically, a hole is provided in the base portion 43, and the camera body 12 is attached to the base portion 43 such that the camera lens and the LEDs are exposed through the hole. As described above, in the third embodiment, the camera body 12 is disposed so as to be housed in the steering column 1. In the third embodiment, the camera body 12 serves as the camera portion of the invention. In addition, although the camera body 12 is attached such that the direction in which the camera body 12 captures an image is an upward direction, the image-capturing direction is not necessarily the strictly vertically upward direction, and the direction may be set in a forward direction slightly tilted upward.

The support portion 45 is fixed to the upper surface of the base portion 43. The support portion 45 is fixed in the vicinity of the front end of the base portion 43. The support shaft 46 is provided on a front end of the mirror portion, and is rotatably connected to the support portion 45. Thus, the support mechanism 42 supports one end (the front end in this embodiment) of the mirror portion 41 such that the mirror portion 41 can pivot about an axis extending in the lateral direction. The mirror portion 41 is a plate-shaped member and has a mirror on at least one side thereof. Under normal conditions, the mirror portion 41 is disposed in the direction such that the light incident from the rear is reflected by the mirror and incident on the camera body 12. In other words, the mirror portion 41 is disposed such that the direction in which the camera body 12 captures an image is directed rearward. Thus, it becomes possible to capture images of a driver by the camera body 12. The support mechanism 42 supports the mirror portion 41 in the above-described arrangement. Note that the mechanism for holding the mirror portion 41 in such a manner that the camera body 12 can capture images of a driver may be any mechanism. For example, the support mechanism 42 may maintain the above-described arrangement of the mirror portion 41 by urging the mirror portion 41 with the use of a spring as in the case of the spring 34 shown in the second embodiment.

As described above, in the third embodiment, the on-board camera 3 includes the camera portion (camera body 12) that is disposed in the steering column 1, and the mirror portion 41 that is disposed on the steering column such that the mirror portion 41 can change the direction in which the camera portion captures an image to a selected direction (rearward direction). According to this configuration, only the mirror portion 41 has to be disposed above the steering column 1, and the camera body 12 may be housed in the steering column 1. Note that there is no need for the support mechanism 42 to pivotally support the mirror portion 41 when it is an object to simplify the components on the steering column 1. Because it is possible to reduce the size of the mirror portion 41 as compared to the camera portion, it is conceivable that it is also possible to design so that the mirror portion 41 and the meter cover 4 are not brought into contact with each other by reducing the height of the mirror portion 41.

Figure 12:
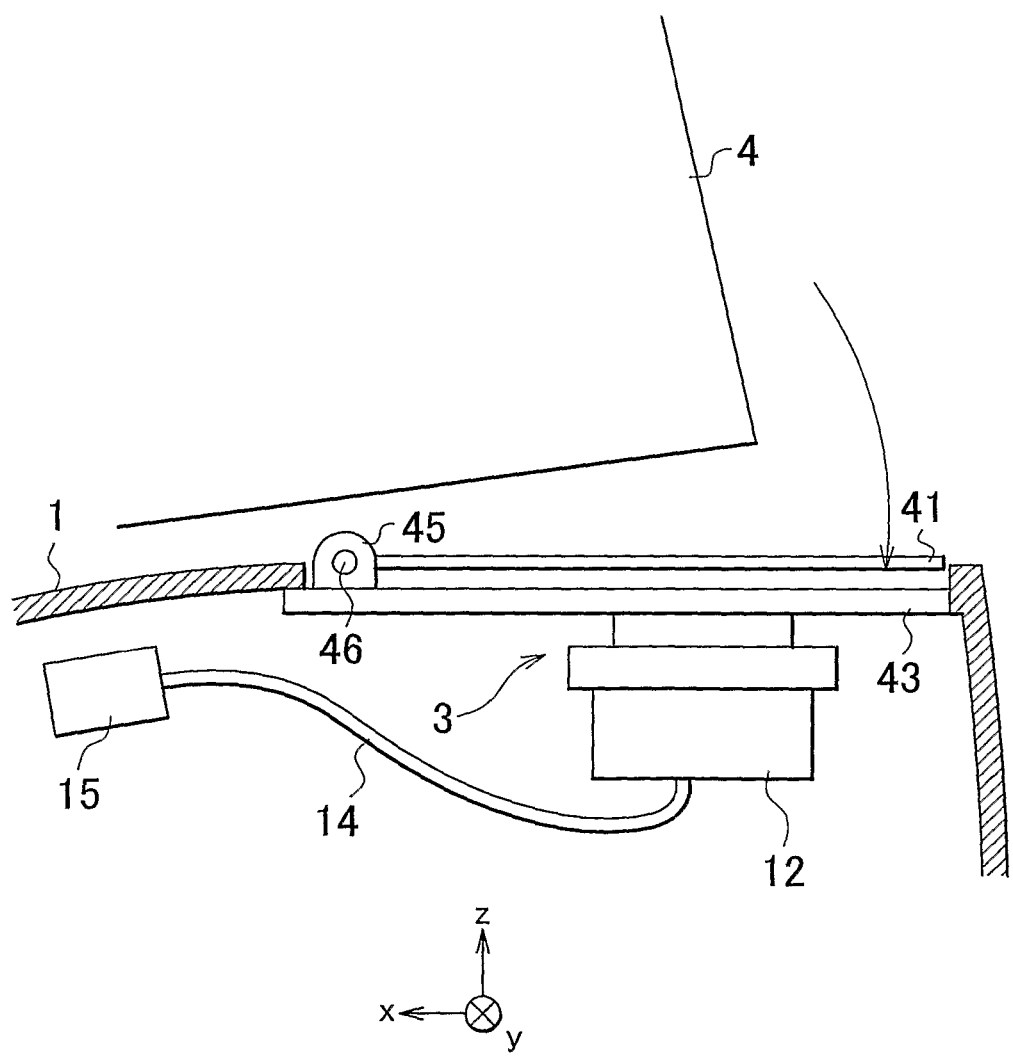
FIG. 12 is a diagram showing a state of the on-board camera according to the third embodiment at the time of a vehicle collision.

FIG. 12 is a diagram showing a state of the on-board camera 3 according to the third embodiment at the time of a vehicle collision. In the case of the third embodiment, when the steering column 1 moves forward in response to a collision of the vehicle, the meter cover 4 is brought into contact with the mirror portion 41 of the on-board camera 3. The mirror portion 41 is pivoted about an axis, extending in the lateral direction, at the portion at which the mirror portion 41 is supported by the support mechanism 42, by the force exerted by the meter cover 4 from the front. As a result, the mirror portion 41 is pivoted to fall rearward as shown in FIG. 12. Thus, the mirror portion 41 retreats from the position at which the mirror portion 41 contacts the meter cover 4, so that the movement of the steering column 1 is not hindered by the contact between the meter cover 4 and the mirror portion 41 (on-board camera 3), and the steering column 1 can therefore move further forward.

As described above, in the third embodiment, the on-board camera 3 has a configuration in which the camera body 12 is housed in the steering column 1, and only the mirror portion 41 protrudes above the steering column 1. In the case of such a configuration, when the steering column 1 moves forward at the time of a vehicle collision, the mirror portion 41 is brought into contact with the meter cover 4. At this time, in the case of the third embodiment, the mirror portion 41 that contacts the meter cover 4 retreats downward. Thus, the interference of the mirror portion 41 of the on-board camera 3 with the meter cover 4 that hinders movement of the steering column 1 is not caused, and it is possible to secure a sufficient range of movement of the steering column 1.

A modification of the mechanism for supporting the mirror portion will now be described. In the third embodiment, the support mechanism 42 pivotally supports one end of the mirror portion 41. In another embodiment, the support mechanism may be any mechanism as long as the mechanism supports the mirror portion 41 in such a manner that the mirror portion 41 can move in a direction such that the mirror portion 41 moves away from the meter cover 4 when the meter cover 4 and the mirror portion 41 are brought into contact with each other because of the forward movement of the steering column 1 at the time of a collision. As the mechanism for retreating the mirror portion 41, the mechanism described below is conceivable, for example.

Figure 13:
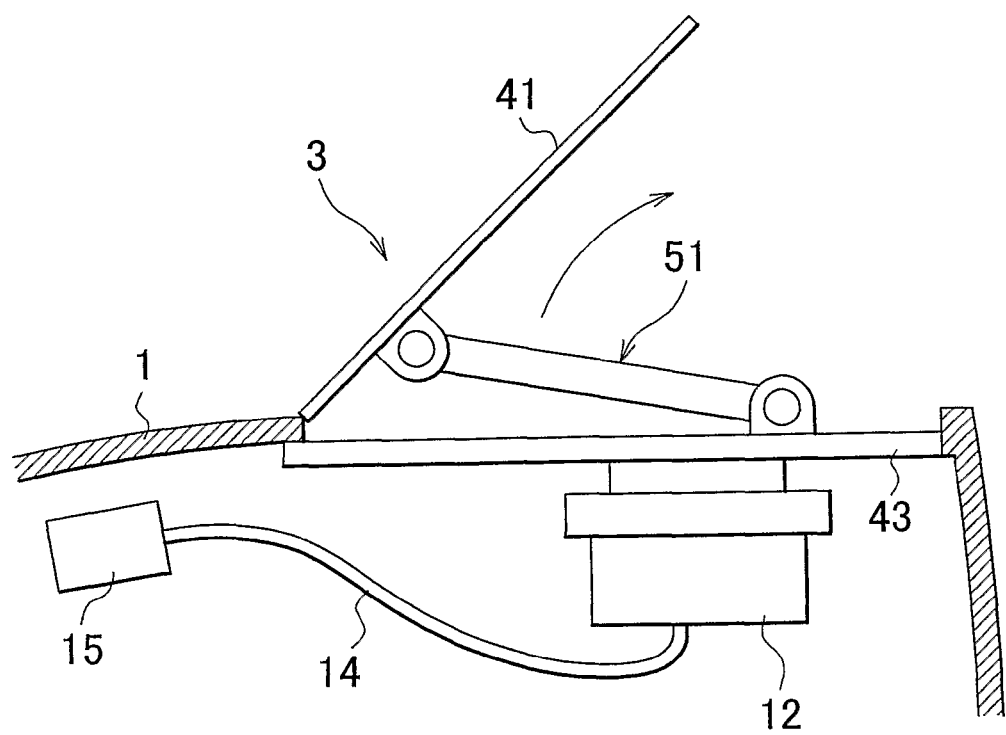
FIG. 13 is a diagram showing a configuration of an on-board camera of a modification of the third embodiment.

FIG. 13 is a diagram showing a configuration of an on-board camera 3 of the modification of the third embodiment. FIG. 13 is a cross sectional view when the on-board camera is viewed in the lateral direction as in the case of FIG. 10. In FIG. 13, the on-board camera 3 is provided with a rod-like support mechanism 51 instead of the support mechanism 42 shown in FIG. 10. The support mechanism 51 is the same as the support mechanism 13 shown in FIG. 3, except that the support mechanism 51 has no connection portion. One end of the support mechanism 51 is fixed to the base portion 43 and the other end of the support mechanism 51 is fixed to the mirror portion 41. It is preferable that the one end of the support mechanism 51 be fixed at a rear portion of the base portion 43. Under normal conditions, the support mechanism 51 supports the mirror portion 41 such that it is possible to capture images of a driver by the camera body 12, as in the case of the support mechanism 42 of the third embodiment. The support mechanism 51 is disposed on either side (or one side) of the camera body 12 with respect to the lateral direction in such a manner that the support mechanism 51 is not positioned in the range of image capture of the camera body 12.

In the case of the configuration shown in FIG. 13, when the steering column 1 moves forward at the time of a vehicle collision, the meter cover 4 is brought into contact with the mirror portion 41 of the on-board camera 3. The support mechanism 51 is pivoted so as to move rearward by the force exerted by the meter cover 4 from the front. As a result, the mirror portion 41 moves rearward. Thus, the mirror portion 41 retreats from the position at which the mirror portion 41 contacts the meter cover 4, so that the movement of the steering column 1 is not hindered by the contact between the meter cover 4 and the mirror portion 41, and the steering column 1 can therefore move further forward.

Figure 14:
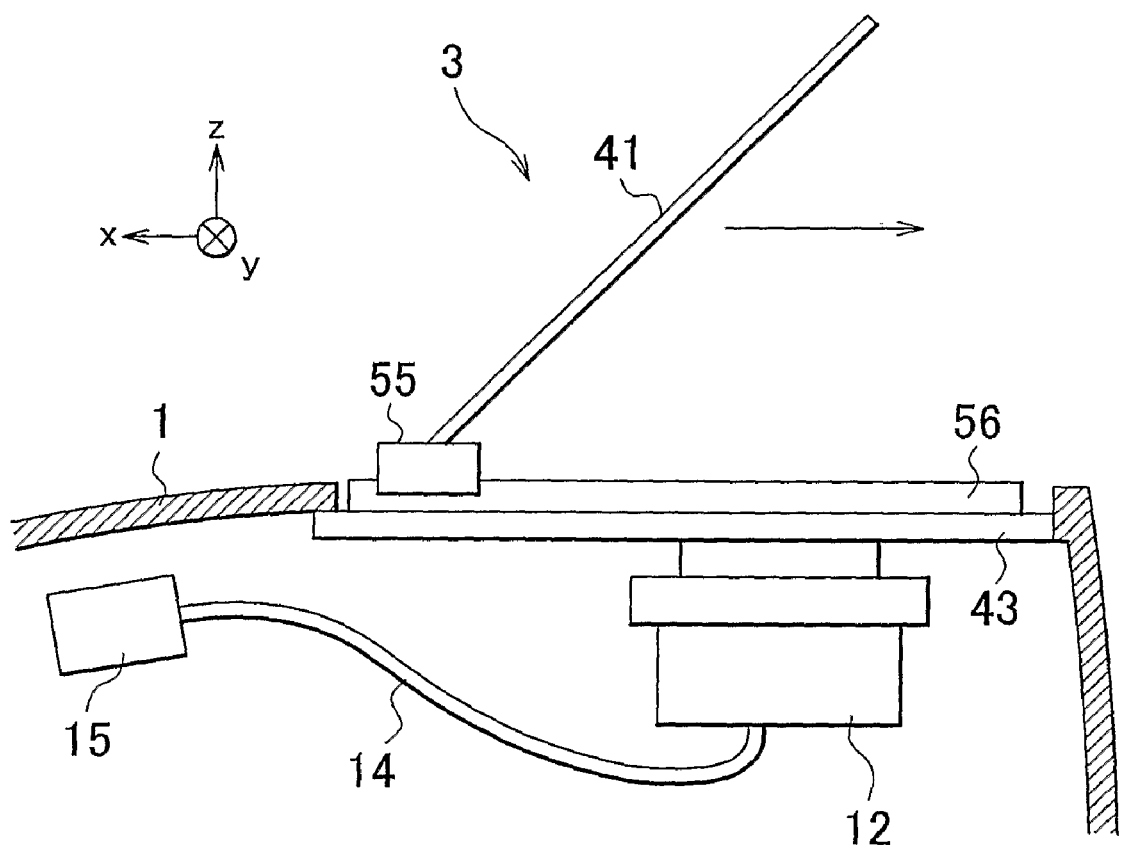
FIG. 14 is a diagram showing a configuration of an on-board camera of another modification of the third embodiment.
Figure 15:
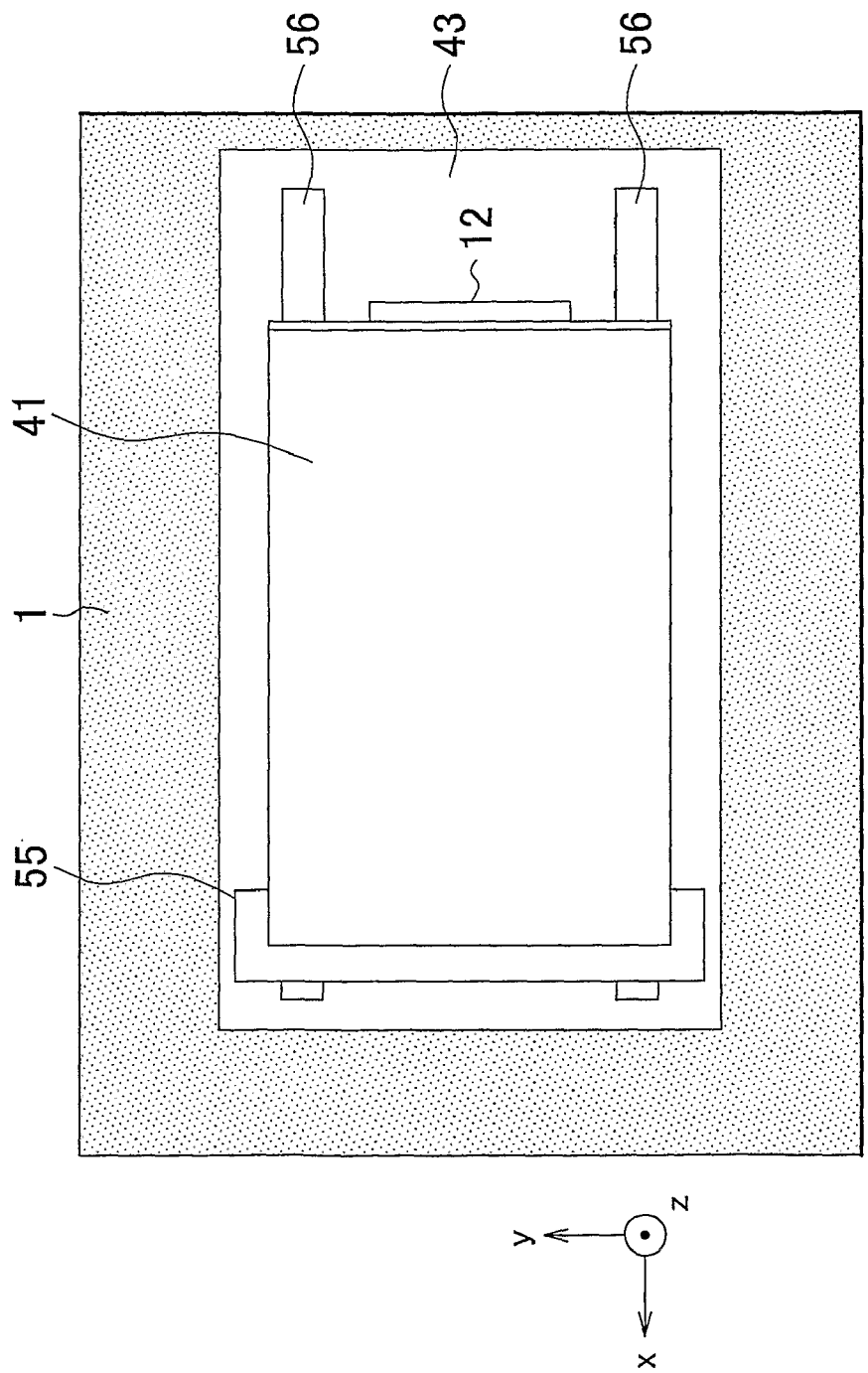
FIG. 15 is a diagram of the on-board camera, shown in FIG. 14, that is viewed from above.

FIG. 14 is a diagram showing a configuration of an on-board camera 3 of another modification of the third embodiment. FIG. 14 is a cross sectional view when the on-board camera is viewed in the lateral direction as in the case of FIG. 10. FIG. 15 is a diagram of the on-board camera, shown in FIG. 14, that is viewed from above. In FIG. 14, the on-board camera 3 is provided with a support mechanism 55 instead of the support mechanism 42 shown in FIG. 10. In addition, rails 56 extending in the longitudinal direction are provided on the upper surface of the base portion 43. The support mechanism 55 is installed so as to be able to slide on the rails 56. Specifically, lower portions of the support mechanism 55 can be fitted on rails 56, and the support mechanism 55 is installed on the rails 56 such that the lower portions are fitted on the rails 56. Under normal conditions, the support mechanism 55 supports the mirror portion 41 such that it is possible to capture images of a driver by the camera body 12.

Under normal conditions, the support mechanism 55 is positioned on the front of the rails 56. The support mechanism 55 may be urged forward by a spring or the like in order to secure the support mechanism 55 on the front of the rails 56 under normal conditions. The on-board camera 55 may be secured on the front of the rails 56 by providing the support mechanism 55 with a hook-like member and engaging the hook-like member with the steering column 1.

In FIGS. 14 and 15, when the steering column 1 moves forward in response to a collision of a vehicle, and the meter cover 4 thus contacts the mirror portion 41, the mirror portion 41 is pushed by the meter cover 4 and slides backward along the rails 56 (see arrows shown in FIG. 14). Thus, the minor portion 41 retreats from the position at which the mirror portion 41 contacts the meter cover 4, so that the movement of the steering column 1 is not hindered by the contact between the meter cover 4 and the minor portion 41, and the steering column 1 can therefore move further forward. As described above, the configuration shown in FIGS. 14 and 15 also allows the mirror portion 41 to retreat in the direction in which the mirror portion 41 moves away from the meter cover 4.

In FIGS. 13 to 15, the components below the base portion 43, that is, the camera body 12, the cable 14, and the connector 15 are the same as those of the third embodiment.

As described above, the invention can be used as an on-board camera that is installed in a vehicle to, for example, monitor the conditions of a driver in order to secure a sufficient range of movement of a steering column.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An on-board camera disposed, behind a neighboring member that is located above a steering column, on the steering column that can move forward at the time of a collision of a vehicle in which the on-board camera is installed, the on-board camera comprising:
   a camera portion; and
   a support mechanism that supports the camera portion in such a manner that the camera portion can move in a direction away from the neighboring member when the neighboring member and the camera portion are brought into contact with each other because of a movement of the steering column at the time of the collision.

2. The on-board camera according to claim 1, wherein the support mechanism supports the camera portion in such a manner that the camera portion can move rearward.

3. The on-board camera according to claim 2, wherein the support mechanism includes:
   a link portion;
   a first support portion that is fixed to the steering column and supports one end of the link portion in such a manner that the link portion can pivot about an axis extending in a lateral direction; and
   a second support portion that is fixed to the camera portion at a position further forward than the first support portion, and supports the other end of the link portion in such a manner that the link portion can pivot about an axis extending in the lateral direction.

4. The on-board camera according to claim 3, wherein the link portion includes a first member supported by the first support portion and a second member supported by the second support portion and connected to the first member in such a manner that the second member can pivot about an axis extending in a lateral direction of the vehicle.

5. The on-board camera according to claim 1, wherein the support mechanism supports the camera portion in such a manner that the camera portion can move into the steering column.

6. The on-board camera according to claim 5, wherein the support mechanism is fixed to the steering column and supports one of a front end and a rear end of the camera portion in such a manner that the camera portion can pivot about an axis extending in a lateral direction of the vehicle.

7. The on-board camera according to claim 6, wherein
the support mechanism includes: a support portion fixed to the steering column; and a support shaft provided on one of the support portion and the front or rear end of the camera portion, and
the support shaft is rotatably connected to the other of the support portion and the front or rear end of the camera portion.

8. The on-board camera according to claim 1, wherein the support mechanism supports the camera portion in such a manner that the camera portion can slide rearward on the steering column.

9. The on-board camera according to claim 8, wherein
the steering column is provided with a rail portion, and
the support mechanism includes a fitting portion fitted together with the rail portion.

10. An on-board camera disposed, behind a neighboring member that is located above a steering column, on the steering column that can move forward at the time of a collision of a vehicle in which the on-board camera is installed, the on-board camera comprising:
a camera portion disposed in the steering column;
a mirror portion having a mirror and disposed on the steering column so as to be directed such that light incident from the rear is reflected by the mirror and incident on the camera portion; and
a support mechanism that supports the mirror portion in such a manner that the mirror portion can move in a direction away from the neighboring member when the neighboring member and the mirror portion are brought into contact with each other because of a movement of the steering column at the time of the collision.

11. The on-board camera according to claim 10, wherein the support mechanism is fixed to the steering column and supports one end of the mirror portion in such a manner that the camera portion can pivot about an axis extending in a lateral direction of the vehicle.

12. The on-board camera according to claim 11, wherein
the support mechanism includes: a support portion fixed to the steering column; and a support shaft provided on one of the support portion and the front or rear end of the mirror portion, and
the support shaft is rotatably connected to the other of the support portion and the front or rear end of the mirror portion.

13. The on-board camera according to claim 10, wherein the support mechanism supports the mirror portion in such a manner that the mirror portion can move rearward.

14. The on-board camera according to claim 10, wherein the support mechanism supports the mirror portion in such a manner that the mirror portion can slide rearward on the steering column.

15. The on-board camera according to claim 14, wherein
the steering column is provided with a rail portion, and
the support mechanism includes a fitting portion fitted together with the rail portion.

* * * * *